United States Patent [19]
Falgari et al.

[11] 4,089,227
[45] May 16, 1978

[54] APPARATUS FOR MEASURING THE RADIAL DIMENSIONS OF A CYLINDRICAL TUBE BY ULTRASONICS

[75] Inventors: Jean Paul Falgari, Brignoud; Jean Perdijon, Saint Ismier; Bernard Voituriez, Grenoble, all of France

[73] Assignee: Commissariat a l'Energie Atomique, Paris, France

[21] Appl. No.: 772,987

[22] Filed: Feb. 28, 1977

[30] Foreign Application Priority Data

Mar. 29, 1976  France ........................... 76 09081

[51] Int. Cl.² ........................................... G01N 29/04
[52] U.S. Cl. ..................................... 73/622; 73/623; 73/625; 73/640
[58] Field of Search ............... 73/67.8 S, 71.5 US, 73/622, 623, 625, 640

[56] References Cited

U.S. PATENT DOCUMENTS

| | | | |
|---|---|---|---|
| 2,989,864 | 6/1961 | Bamford | 73/67.8 S |
| 3,121,324 | 2/1964 | Cowan | 73/67.8 S X |
| 3,828,609 | 8/1974 | Furon et al. | 73/67.8 S |

FOREIGN PATENT DOCUMENTS

| | | | |
|---|---|---|---|
| 2,041,006 | 1/1971 | France | 73/67.8 R |

*Primary Examiner*—Richard C. Queisser
*Assistant Examiner*—John P. Beauchamp
*Attorney, Agent, or Firm*—Lane, Aitken, Dunner & Ziems

[57] ABSTRACT

Apparatus for measuring the radial dimensions of a cylindrical tube by ultrasonics by means of which it is possible to measure the radial dimensions of said tube in directions perpendicular to the direction of the ultrasonic beam or beams emitted by one or more transducers, comprising a fixed ultrasonic transducer, whose emitting part is shaped like a cylindrical ring emitting ultrasonic pulses in accordance with a bundle of rays substantially parallel to the generating lines of the cylindrical tube, a truncated cone-shaped mirror whose apex angle is equal to 90° and whose axis is parallel to the radii of the bundle of ultrasonic rays emitted by the transducer or transducers, a rotary shield having at least one opening arranged between the transducer and the tube whose radial dimensions are to be measured and means for collecting the ultrasonic echo returned by the tube and for measuring the time gaps separating the reception of said echos.

A particular application is in nuclear power stations where tubes having precise dimensions are required in heat exchangers and for encasing fuel.

10 Claims, 4 Drawing Figures

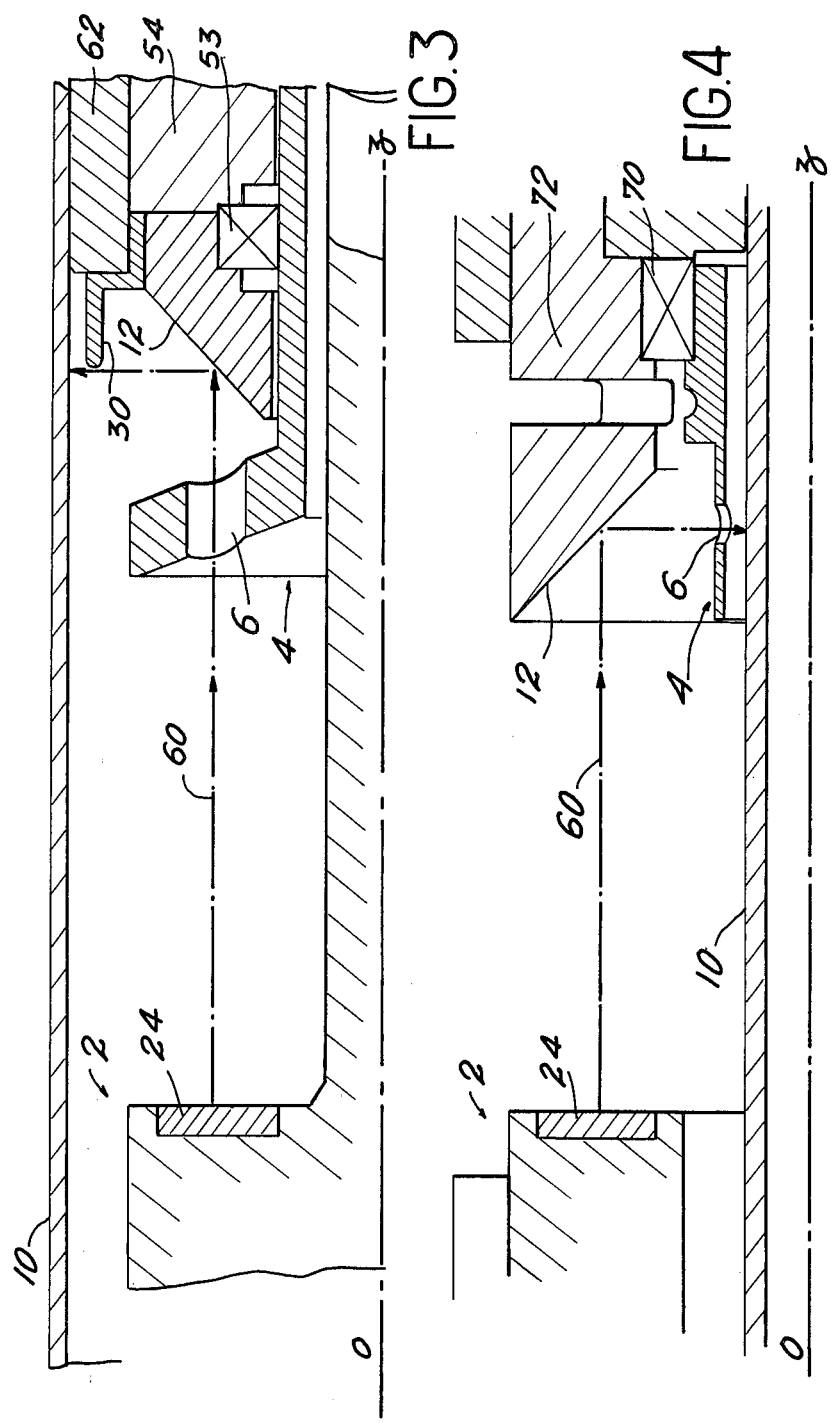

APPARATUS FOR MEASURING THE RADIAL DIMENSIONS OF A CYLINDRICAL TUBE BY ULTRASONICS

BACKGROUND OF THE INVENTION

The present invention relates to the measurement of the dimensions of an object by the emission of ultrasonic pulses and the reception of the echos returned by said object, whereby the time gap separating the reception of the different echos makes it possible to determine the distance separating the various echo-generating obstacles.

The invention has more particularly for its object the continuous measurement of the radial dimensions of cyclindrical tubes in order to check the values of the inside and outside radii of said tubes according to different azimuths.

The development of nuclear power stations has led to a considerable demand for tubes with very accurate dimensions, for example, tubes used in the heat exchangers of said nuclear reactors and the fuel sheathing tubes. This has led to research aiming at an improvement in the existing devices for the continuous measurement, for example by ultrasonics, of the dimensions of said tubes.

A known method for measuring the dimensions of a tube by ultrasonics comprises using two diametrically opposite transducers whose emitting faces are such that they transmit rays perpendicular to the tube axis and collect the rays reflected by the internal and external surfaces of the cylindrical tube, which makes it possible to measure the inside and outside radii. In order to observe the diameters, ovalization and various thicknesses of the tube according to different azimuths, it is possible to continuously displace the tube in front of transducers, whilst also rotating it about its axis so that a point on the tube surface has a helical movement and the different radii of the tube are measured for different aximuths. However, this type of device has disadvantages because the mechanical uncertainties and errors in the displacement of the tube, particularly due to the rotary movement thereof, lead to measuring errors. The same applies if the rotation of the tube is replaced by the rotation of the pair of transducers.

Another apparatus which avoids giving the tubes a rotary movement, whereby the continuous measurement of the tube dimensions is effected by a single translation of the cylindrical tube comprises arranging a series of transducers in a ring around the cylindrical tube axis, said transducers being grouped in pairs, whereby the two transducers of one pair of transducers face one another and simultaneously emit in order to measure the inside and outside diameters of the tube, whereby the different pairs of transducers arranged in the form of a ring are sequentially excited. However, this apparatus is relatively costly because it involves the use of a large number of transducers. The signal processing electronic system is complicated because it involves the sequential classification of the data collected by the transducers and in addition the measurement is only performed according to a discrete number of azimuths and in general according to four or six generating lines.

BRIEF SUMMARY OF THE INVENTION

The object of the present invention is a measuring apparatus by ultrasonic pulse emission, which is simpler, more reliable and less expensive.

The apparatus according to the invention comprises a fixed ultrasonic transducer whose emitting part is shaped like a cylindrical ring which emits ultrasonic pulses in accordance with a bundle of rays which are substantially parallel to one another. In the case of the observation of a cylindrical tube, no matter whether the apparatus is inside or outside said cylindrical tube, the emitted rays are parallel to the generating lines of the cylinder of the cylindrical tube. The apparatus according to the invention also comprises a truncated cone-shaped mirror, whose apex angle is equal to 90° and whose truncated cone axis coincides in the case of a cylindrical tube with the axis of said tube, and more generally in the case of a random object parallel to the radius of the bundle of ultrasonic rays emitted by the transducer or transducers. The rays which strike the truncated cone-shaped mirror have an angle of incidence of 45° and are reflected perpendicular to the initial direction to strike the tube in accordance with the radii thereof.

The apparatus according to the invention also comprises a rotary shield with at least one opening located between the transducer and the object whose dimensions are to be measured, whereby said opening permits the passage of pulse bursts and returning echos according to different angles or aximuths, and means for collecting the ultrasonic echo returned by the object and for measuring the time gap separating the reception of these echos.

These electronic means for echo reception and timing purposes are conventional and will not be described in detail here because they are well known to the electronics expert. The apparatus according to the invention also comprises means for the translation of the tube in accordance with a direction parallel to its axis and for ensuring the coupling (the whole apparatus with the exception of the driving means is submerged in water).

According to one embodiment of the invention, in order to have a fixed reference, a generally cylindrical obstacle can be provided which occults or hides part of the bundle of rays emitted by the transducer or transducers in order to have a reference echo permitting the standardization of distances.

This obstacle can be placed as close as possible to the tube in order to limit (water level) corrections due to the variation in the speed of sound in water with temperature. In general, the obstacle has a cylindrical shape of the same axis as the tube to be controlled for reflecting the ultrasonic beam.

BRIEF DESCRIPTION OF THE DRAWINGS

Other features and advantages of the invention can be gathered from the following description of exemplified and non-limitative embodiments with reference to the attached drawings in which:

FIG. 3 an embodiment of the apparatus according to the invention placed within a cylindrical tube whose dimensions are to be measured.

FIG. 4 an embodiment of the invention where the obstacle and shield are joined to one another and can move around the axis of the cylinder whose radial dimensions are to be measured.

DETAILED DESCRIPTION OF THE PREFERRED EMBODIMENTS

Figure 1:
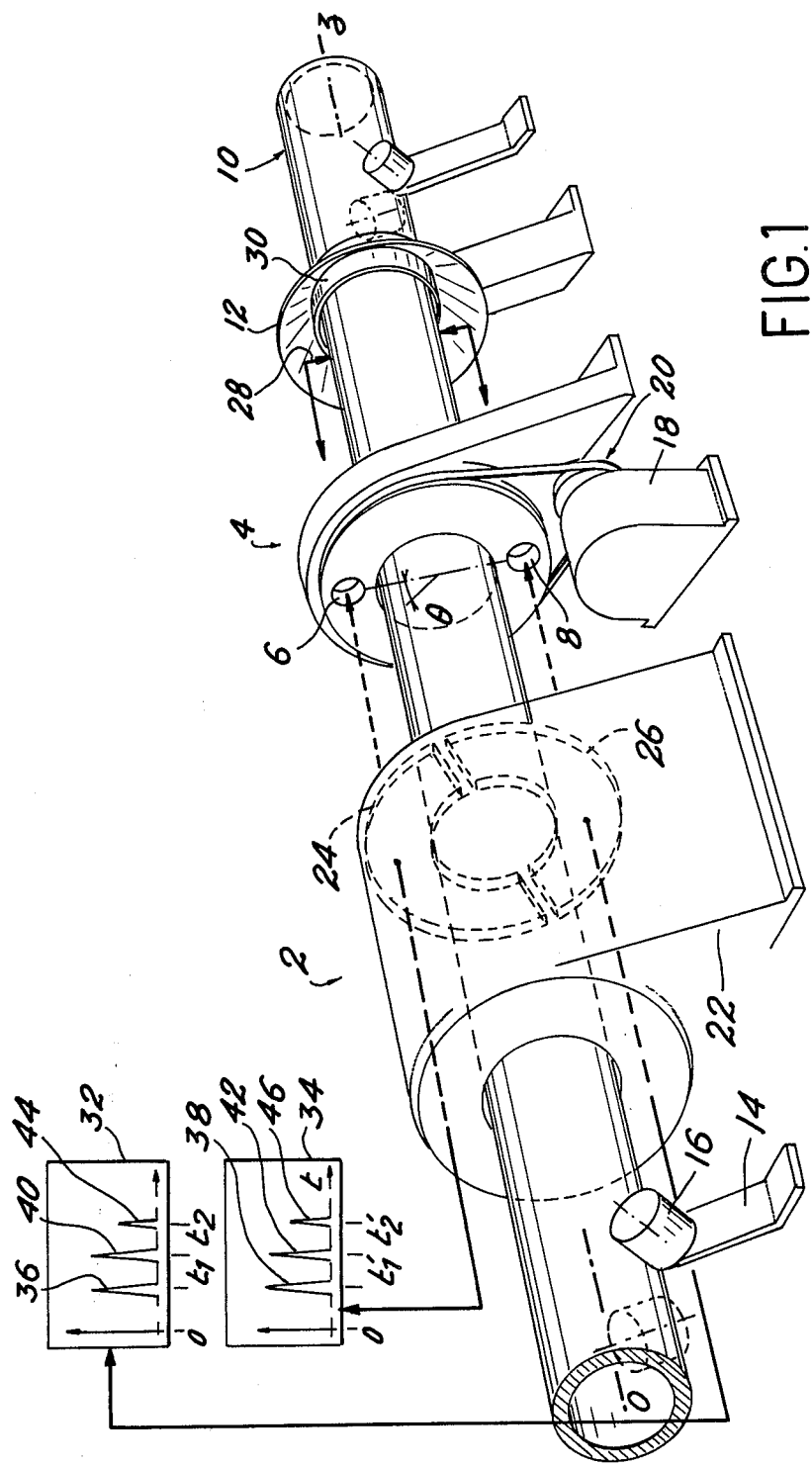
FIG. 1 a general view of the apparatus according to the invention.

FIG. 1 shows an apparatus according to the invention having a transducer designated by the general reference 2, a rotary disk 4 with openings 6 and 8, which are diametrically opposite relative to the axis of tube 10, whose different radii are to be measured and a truncated cone-shaped mirror 12 whose apex angle is 90°. The apparatus also comprises an armed support 14, equipped with rotary rollers 16 moving tube 10 in accordance with the oriented axis Oz. A motor 18 rotates wheel 20 which drives the rotary disk 4 by means of a pulley. Obviously, other systems can be used for rotating disk 4. In this embodiment, the transducer fixed to the frame by casing 22 comprises two emitting-receiving parts 24, 26 each occupying a sector of 180°.

The apparatus functions in the following way. The rotary disk is permanently rotated about axis Oz, along which moves the cylindrical tube. At regular intervals, the two parts of transducer 2, corresponding to sectors 24 and 26, emit pulses which are simultaneously or very close to one another, whereby part of said pulse train passes through the openings 6 and 8 of rotary disk 4 for a particular angular position $\theta$ of the disk, said pulses propagating up to mirror 12, being reflected in accordance with radii 28 directed radially relative to cylindrical tube 10. To ensure that the pulses are simultaneous, it is necessary to use two emission-reception electronic systems. However, for economy reasons, often only a single electronic system with switching is used. The pulses are not then simultaneous, but have a slight time lag and the displacement of the tube between the two pulses is negligible. In this embodiment, a fixed cylindrical annular ring 30 has been added which occults part of the bundle of rays emitted by the transducers. This ring, of constant diameter permits a calibration of the tube dimensions. The echos which are reflected due to the internal and external surfaces of the cylindrical tube and to the ring 30 are collected after traversing the openings by the two sectors 24 and 26 of the transducer functioning as a receiver. These echos are then observed as a function of time by a suitable electronic device such as an oscilloscope. These various echos are shown on diagrams 32 and 34. The first echo such as 36 and 38 corresponds to the reflection of ring 30, the second echo such as 40 or 42 the reflection on the external surface of the tube and the third echo such as 44 or 46 the reflection by the internal surface of the cylindrical tube. The external diameter of the tube is given by the formula $\phi_e = D - (t_1 + t_1') V$, in which $D$ is the diameter of ring 30, $V$ the speed of sound in the coupling material, $e_1 = T_2 V$, $e_2 = t'_2 V$, $e_1$ and $e_2$ being the thicknesses of the cylindrical tube and $V'$ the speed of sound in the tube.

Obviously, the complete system is submerged in water or in an impedance adapting liquid medium. Members 2, 4 and 12 are submerged. However, it is preferable to position motor 18 outside the coupling liquid. On the basis of times $t_1$ and $t_1'$, it is possible to deduce the variation between the diameter of the tube and the diameter of the calibration ring 30 and thus the external diameter $\phi_e$ of the tube for a given meridian plane, corresponding to the angle $\theta$ of the position of the rotary disk. The knowledge of times $t_2$ and $t_2'$ makes it possible to measure, with the knowledge of the speed of sound in the material constituting the tube, the thicknesses of tubes $e_1$ and $e_2$, in accordance with two diametrically opposite points; and the internal diameter $\phi_i$ is obtained by subtracting the quantity $e_1 + e_2$ from the external diameter $\phi_e$. As soon as this measurement has been carried out for one position of the rotary disk, new ultrasonic pulses are emitted by sectors 24, 26 for another position of the rotary disk, so that the same measurements are carried out for another angle $\theta$.

It is possible to measure only the thickness by using a transducer in one piece and a shield with a single opening.

Figure 2:
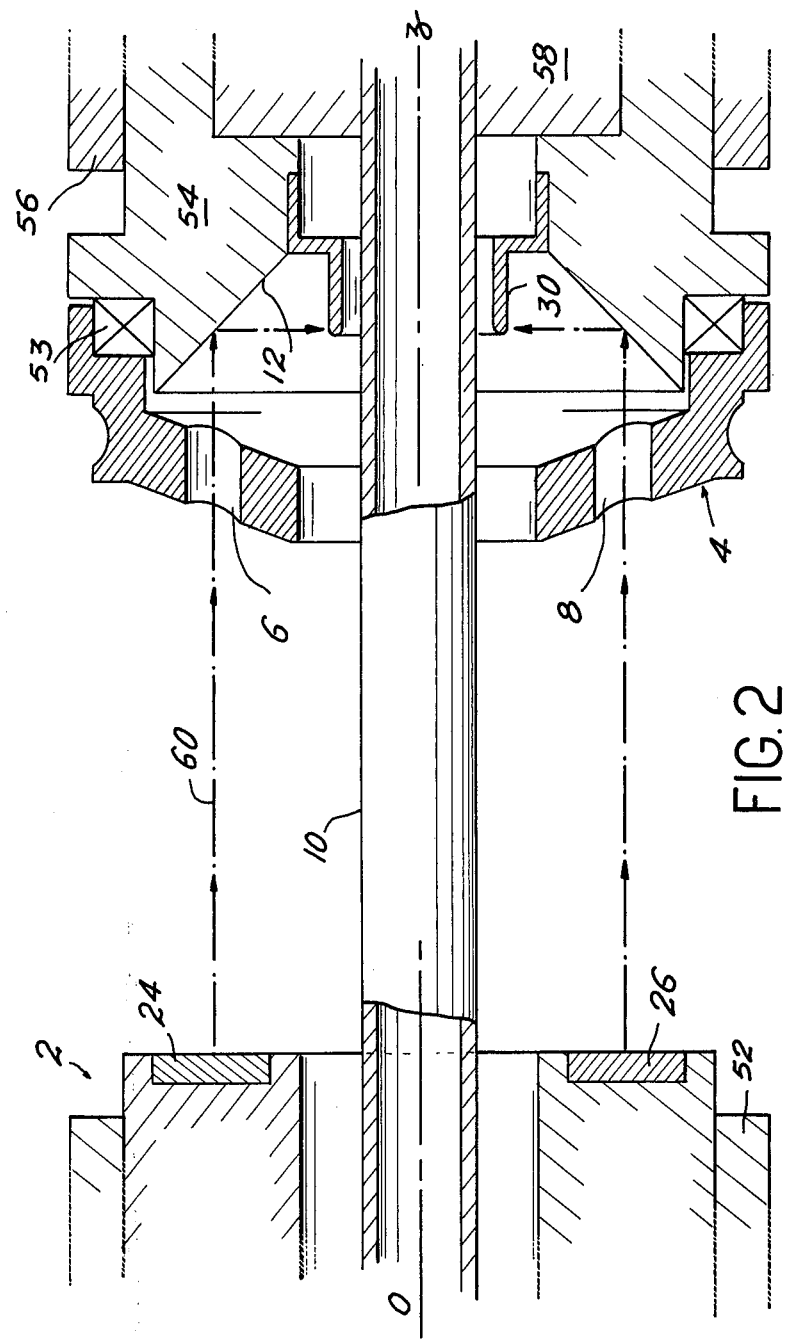
FIG. 2 a sectional view illustrating the mechanical construction of the apparatus according to the invention.

FIG. 2 shows a preferred embodiment of the invention, which is substantially analogous to that shown in FIG. 1, whereby the same references designate the same components as in FIG. 1. The apparatus of FIG. 2 is shown in section. In FIG. 2, only the mechanical aspects of the apparatus are shown, because the electronic part of the apparatus is well known to the skilled expert. Transducer 2 has an emitting-receiving zone subdivided into two parts 24 and 26 and secured by a fixed cylinder 52. Transducer 2 is a housing formed by two coaxial cylinders and a base, whereby the space between the two cylinders is filled by a damping agent such as araldite. The damping agent's surface carries two 180° sectors made for example from barium titanate which emit and receive ultrasonics. The thickness of sectors 24 and 26, measured according to the axis of the cylinders is determined as a function of the desired frequency. Tube 10 passes into a slot in transducer 2. The driving device for tube 10 is not shown. The rotary disk 4 has two openings 6 and 8 and rotates via bearing 53 on a fixed frame 54 integral with a cylinder 56 and centred by means of ring 58. Mirror 12 is machined in frame 54. An obstacle having the shape of a ring 30 occults part of the bundle of ultrasonic waves shown by dotted line 60 and constitutes a standard of known dimensions serving as a standard for the measurement of distances corresponding to the echos returned by tube 10 and ring 30. The tube diameter is measured in relative manner with reference to said circular ring 30. The apparatus shown in FIG. 2 surrounds the tube for measuring its internal and external dimensions.

FIG. 3 shows an apparatus similar to that of FIG. 2, except that it is located within the tube. The apparatus is shown in sectional form, symmetrical relative to axis Oz and placed within the cylindrical tube 10 whose dimensions are to be observed. Member 62 makes it possible to centre the whole apparatus relative to tube 10 and the rotary disk 4 rotates about axis Oz by means of bearing 53 fixed to frame 54. In this embodiment, mirror 12 is clearly arranged in an appropriate direction relative to the propagation of the ultrasonic rays 60.

In FIGS. 2 and 3, the rotary shield is conical to prevent parasitic reflections.

FIG. 4 shows a variant of the apparatus according to which the rotary shield 6 is located between mirror 12 and tube 10. Shield 6 rotates via bearing 70 about axis Oz, whereby bearing 70 is fixed to fixed frame 72. In this case, the unperforated part of the shield can also fulfill the function of ring 30.

It is obvious that it is also possible to join together the rotary disk and the conical mirror.

Preferably, transducers are used which have a high damping level in order to improve their resolution and in addition they must have a high emission frequency. Obviously, the rotation speed of the rotary disk and the diameter of the holes are calculated in such a way that the ultrasonic pulses can effect a backwards and forwards movement between emitter-receiver and the object without this bundle of rays being substantially occulted by the rotation of the rotary disk. As the ultrasonic propagation speeds, 1500m/s in coupling liquids such as water are high this condition is not restraining.

The apparatus according to the invention has a particularly simple mechanical and electrical construction. The main advantage is still the elimination of the rotary movement, together with the resulting vibrations which necessarily cause measuring errors. Thus, the position of the tube relative to the measuring apparatus is only affected by the translation movement. Another advantage of the apparatus according to the invention is that it can be adapted to any stand for the movement of tubes by translation with the already existing dimensional control electronics. Details on electronic control devices are available in numerous publications and more particularly the article of Mr. John G. RUMBOLD "Ultrasonic dimensional tube testing technics", 34th National Fall Conference of the American Society for Non-Destructive Testing, MICHIGAN (U.S.A), Oct. 21/24 1974.

The invention is not limited to the embodiments described and represented hereinbefore and various modifications can be made thereto without passing beyond the scope of the invention.

What is claimed is:

1. An apparatus for measuring the radial dimensions of a cylindrical tube by ultrasonics by means of which it is possible to measure the radial dimensions of said tube in directions perpendicular to the direction of the ultrasonic beam or beams emitted by one or more transducers, wherein it comprises a fixed ultrasonic transducer, whose emitting part is shaped like a cylindrical ring emitting ultrasonic pulses in accordance with a bundle of rays substantially parallel to the generating lines of the cylindrical tube and receiving echoes of said pulses, a truncated cone-shaped mirror whose apex angle is equal to 90° and whose axis is parallel to the radii of the bundle of ultrasonic rays emitted by the transducer or transducers, a rotary shield having at least one opening arranged between the transducer and the tube whose radial dimensions are to be measured and means connected to said transducer for measuring the time gaps separating the reception of the ultrasonic echoes returned by the tube.

2. An apparatus according to claim 1, wherein it also comprises mechanical means for moving the tube parallel to the radius of the bundle of ultrasonic rays emitted by the transducer or transducers.

3. An apparatus according to claim 1, wherein the transducer - mirror- rotary shield assembly is located inside the cylindrical tube.

4. An apparatus according to claim 1, wherein the entire transducer - mirror-rotary shield assembly is located outside the cylindrical tube.

5. An apparatus according to claim 1, wherein said rotary shield has two diametrically opposite openings on either side of its rotation axis.

6. An apparatus according to claim 5, wherein the active part of the ultrasonic transducer comprises two electrically independent semi-cylindrical rings, which are located symmetrically relative to the rotation axis of the rotary shield.

7. An apparatus according to claim 1, wherein the rotary shield is located between the transducer or transducers and the truncated cone-shaped mirror.

8. An apparatus according to claim 1, wherein the rotary shield and the mirror are fixed together and rotatable.

9. An apparatus according to claim 1, wherein it also comprises a fixed flat obstacle occulting part of the bundle of rays emitted by the transducer or transducers and located in the vicinity of the cylindrical tube to be measured.

10. An apparatus according to claim 1, wherein it also comprises a cylindrical obstacle fixed to the rotary shield and occulting part of the bundle of rays emitted by the transducer or transducers and located in the vicinity of the cylindrical tube to be measured.

* * * * *